United States Patent
Biswas et al.

(10) Patent No.: US 10,102,194 B2
(45) Date of Patent: Oct. 16, 2018

(54) SHARED KNOWLEDGE ABOUT CONTENTS

(71) Applicant: Microsoft Technology Licensing, LLC, Redmond, WA (US)

(72) Inventors: Arindam Biswas, Hyderabad (IN); Saloni Agarwal, Jamshedpur (IN); Gowthami Chegu, Hyderabad (IN); Bibhu Choudhary, Hyderabad (IN); Rahul Razdan, Hyderabad (IN); Arif Alam Siddique, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/378,131

(22) Filed: Dec. 14, 2016

(65) Prior Publication Data
US 2018/0165262 A1 Jun. 14, 2018

(51) Int. Cl.
*G06F 17/00* (2006.01)
*G06F 17/24* (2006.01)
*G06F 17/22* (2006.01)

(52) U.S. Cl.
CPC ........ *G06F 17/241* (2013.01); *G06F 17/2247* (2013.01)

(58) Field of Classification Search
CPC .................................................... G06F 17/241
See application file for complete search history.

(56) References Cited

U.S. PATENT DOCUMENTS

| | | | | |
|---|---|---|---|---|
| 8,190,990 | B2* | 5/2012 | Le | G06F 17/30882 715/230 |
| 8,706,685 | B1* | 4/2014 | Smith | G06F 17/30882 707/608 |
| 8,751,919 | B2* | 6/2014 | Albornoz | G06F 17/2235 345/173 |
| 9,292,617 | B2* | 3/2016 | Chandra | G06F 17/30899 |
| 2003/0061200 | A1* | 3/2003 | Hubert | G06F 17/30011 |
| 2004/0205542 | A1* | 10/2004 | Bargeron | G06F 17/241 715/201 |
| 2005/0091027 | A1* | 4/2005 | Zaher | G06F 17/2229 703/22 |
| 2005/0108001 | A1* | 5/2005 | Aarskog | G06F 17/271 704/10 |

(Continued)

OTHER PUBLICATIONS

Fance, Charnita, "Top Web Annotation and Markup Tools", Retrieved on: Aug. 16, 2016 Available at: http://www.hongkiat.com/blog/top-web-annotation-and-markup-tools/, 14 pages.

(Continued)

*Primary Examiner* — Laurie A Ries (57) ABSTRACT

Described herein is a method of web browser enabled annotation sharing comprising receiving information associated with the annotation, creating an anchored annotation based upon the received information associated with the annotation; and storing the anchored annotation. Further described herein is a method of retrieving an anchored annotation comprising receiving a request for an anchored annotation associated with particular content, retrieving anchored annotations associated with the particular content, filtering the retrieved anchored annotations; and, providing the filtered retrieved anchored annotations (e.g., to user(s) viewing the same content).

20 Claims, 11 Drawing Sheets

(56) References Cited

U.S. PATENT DOCUMENTS

| | | | | |
|---|---|---|---|---|
| 2005/0134606 | A1* | 6/2005 | Hong | G06F 17/241 345/619 |
| 2005/0160355 | A1* | 7/2005 | Cragun | G06F 17/241 715/230 |
| 2005/0160356 | A1* | 7/2005 | Albornoz | G06F 17/2288 715/229 |
| 2005/0270294 | A1* | 12/2005 | Le Tuan | G06T 13/00 345/473 |
| 2006/0048047 | A1* | 3/2006 | Tao | G06F 17/241 715/232 |
| 2006/0149558 | A1* | 7/2006 | Kahn | G10L 15/063 704/278 |
| 2006/0206462 | A1* | 9/2006 | Barber | G06F 17/30657 |
| 2007/0061704 | A1* | 3/2007 | Simova, IV | G06F 17/2247 715/210 |
| 2009/0077658 | A1* | 3/2009 | King | G06F 17/30619 726/21 |
| 2009/0204882 | A1* | 8/2009 | Hollander | G06F 17/241 715/230 |
| 2009/0248516 | A1* | 10/2009 | Gross | G06F 17/30899 705/14.66 |
| 2009/0307215 | A1* | 12/2009 | Ball | G06F 17/30867 |
| 2010/0278453 | A1* | 11/2010 | King | G06Q 10/10 382/321 |
| 2010/0325557 | A1* | 12/2010 | Sibillo | G06F 3/0481 715/751 |
| 2011/0258526 | A1* | 10/2011 | Supakkul | G06F 17/241 715/230 |
| 2012/0060082 | A1* | 3/2012 | Edala | G06F 17/241 715/231 |
| 2013/0091240 | A1* | 4/2013 | Auger | G06F 17/241 709/217 |
| 2013/0298003 | A1* | 11/2013 | Nikankin | G06F 17/241 715/230 |
| 2014/0173393 | A1* | 6/2014 | Roy | G06F 17/218 715/201 |
| 2014/0344025 | A1* | 11/2014 | Pagan | H04L 67/306 705/12 |
| 2015/0278180 | A1* | 10/2015 | Nicholas, Jr. | G06F 17/241 715/230 |
| 2016/0225059 | A1* | 8/2016 | Chow | G06Q 30/0625 |
| 2017/0132288 | A1* | 5/2017 | Ho | G06F 17/30528 |

OTHER PUBLICATIONS

Olanoff, Drew, "Marker to lets you highlight annotate and share on the web", Published on: Oct. 7, 2011 Available at: http://thenextweb.com/apps/2011/10/07/marker-to-lets-you-highlight-annotate-and-share-on-the-web/#gref, 7 pages.

"Bookmarking for the Exceptionally Inquisitive", Retrieved on: Aug. 16, 2016 Available at: https://annotary.com/, 2 pages.

* cited by examiner

SHARED KNOWLEDGE ABOUT CONTENTS

BACKGROUND

With the growth of the Internet, vast quantities of information is readily available to users around the globe. However, identifying and understanding relevant information can be a daunting task for users.

SUMMARY

Described herein is a method of web browser enabled annotation sharing comprising receiving information associated with the annotation from a web browser, creating an anchored annotation based upon the received information associated with the annotation; and storing the anchored annotation.

Further described herein is a computer storage media storing computer-readable instructions that when executed cause a computing device to receive a request from a web browser for an anchored annotation associated with particular content, retrieve anchored annotations associated with the particular content, filter the retrieved anchored annotations; and, provide the filtered retrieved anchored annotations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to creating, storing, sharing, retrieving and/or presenting anchored annotation(s) of particular contents (e.g., web pages) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding creating, storing, sharing, retrieving and/or presenting anchored annotation(s). What follows are one or more exemplary systems and methods.

Aspects of the subject disclosure pertain to the technical problem of sharing knowledge about contents (e.g., selectively). The technical features associated with addressing this problem involve using a first browser, receiving an annotation to at least a portion of a particular content and providing information regarding the annotation to an annotation storage/retrieval system. The annotation storage/retrieval system can create an anchored annotation, store the anchored annotation and/or selectively retrieve the anchored annotation in response to a request for anchored annotations related to the particular content. The request can be received from a second browser that can present the anchored annotation, for example, to a user, using the second browser. Accordingly, aspects of these technical features exhibit technical effects of more efficiently and effectively storing and/or retrieving information about content, for example, increasing user satisfaction in viewing the content.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Figure 1:
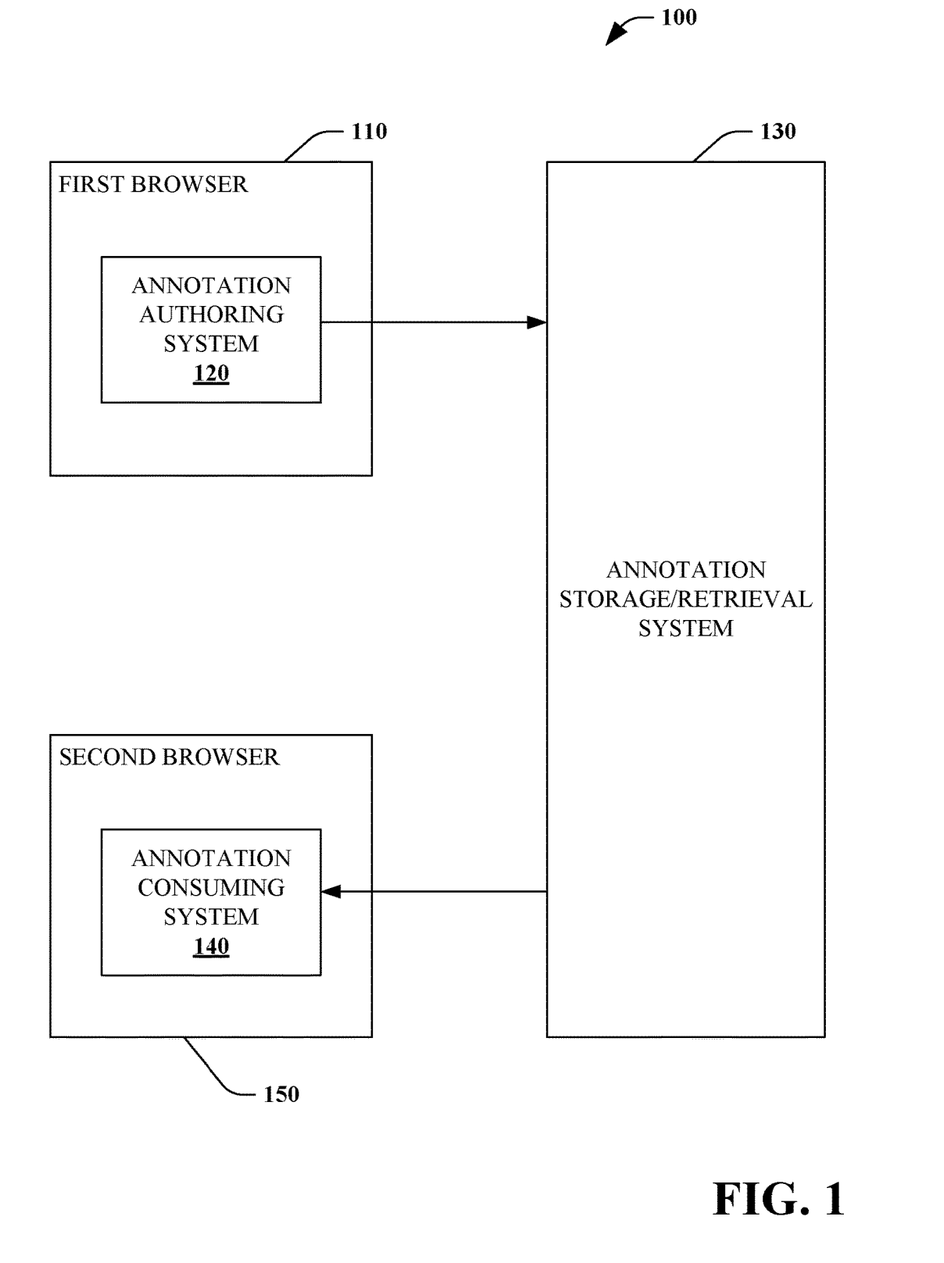
FIG. 1 is a functional block diagram that illustrates a system for anchored annotations.

Referring to FIG. 1, a system for anchored annotations 100 is illustrated. The system 100 can be used to create, store, retrieve and/or present anchored annotation(s), for example, of web content. The system 100 can provide affordance in web browsers to build shared knowledge on content on the web so that reader(s) can benefit from analysis done by previous reader(s) (e.g., annotation author(s)). For example, anchored annotation(s) can help users to understand other reader's perspective on a particular piece of content. Further, users can also quickly understand major highlights of the particular piece of web content, thus saving significant time and effort. In this manner, by analogy, web browsers can convert web content into a second hand book where previous users' annotation(s) are available to guide other reader(s).

For example, when researching on a topic on the Internet, a user can discover a large quantity of articles (e.g., on common topics). Reading these contents to capture important points takes huge amount of effort. To further complicate matter, frequently multiple piece of web content discuss a similar item perhaps in a slightly different manner. However, in order to determine these redundancies, a user would need to, at least at a high level, consume those web contents.

In order to leverage consumption of web contents by other(s) (e.g., knowledgeable user(s), user(s), entity(ies) and the like), the system 100 facilitates creation, storage, retrieval and/or presentation of anchored annotation(s). Accordingly, while consuming web content, a user of the system 100 can benefit from anchored annotation(s) (e.g., note(s), comment(s), explanation(s), thoughts and the like) created by another user (e.g., trusted user). In one embodiment, contrary to "comment" sections of web pages, the anchored annotation(s) can be user selectable (e.g., by creator and/or consumer of annotation(s)) based, for example, upon a user identifier (e.g., uniquely identifies a particular user of the system 100), a user role (e.g., employee of a particular entity utilizing the system 100), a subscription (e.g., paid) and the like. In one embodiment, anchored annotation(s) associated with particular web content (e.g., web page) can be searchable, for example, based upon particular text (e.g., words and/or phrases) in an anchored annotation and/or associated with a particular user identifier.

The system 100 includes a first browser 110 with an annotation authoring system 120. The annotation authoring system 120 provides annotation(s) to an annotation storage/retrieval system 130 which creates and stores anchored annotation(s). The annotation storage/retrieval system 130 provides anchored annotation(s) in response to a request for annotation(s) received from an annotation consuming system 140 of a second browser 150. In one embodiment, the first browser 110 and the second browser 150 are instances of a browser (e.g., web browser) on the same computing system. In one embodiment, the first browser 110 and the second browser 150 are instances of browsers (e.g., web browsers) on physically different computing systems.

In one embodiment, the annotation storage/retrieval system 130 is communicatively coupled to the first browser 110 and/or the second browser 150 via the Internet. In one embodiment, the annotation storage/retrieval system 130 is communicatively coupled to the first browser 110 and/or the second browser 150 via a computer network (e.g., wired, wireless, etc.).

Figure 2:
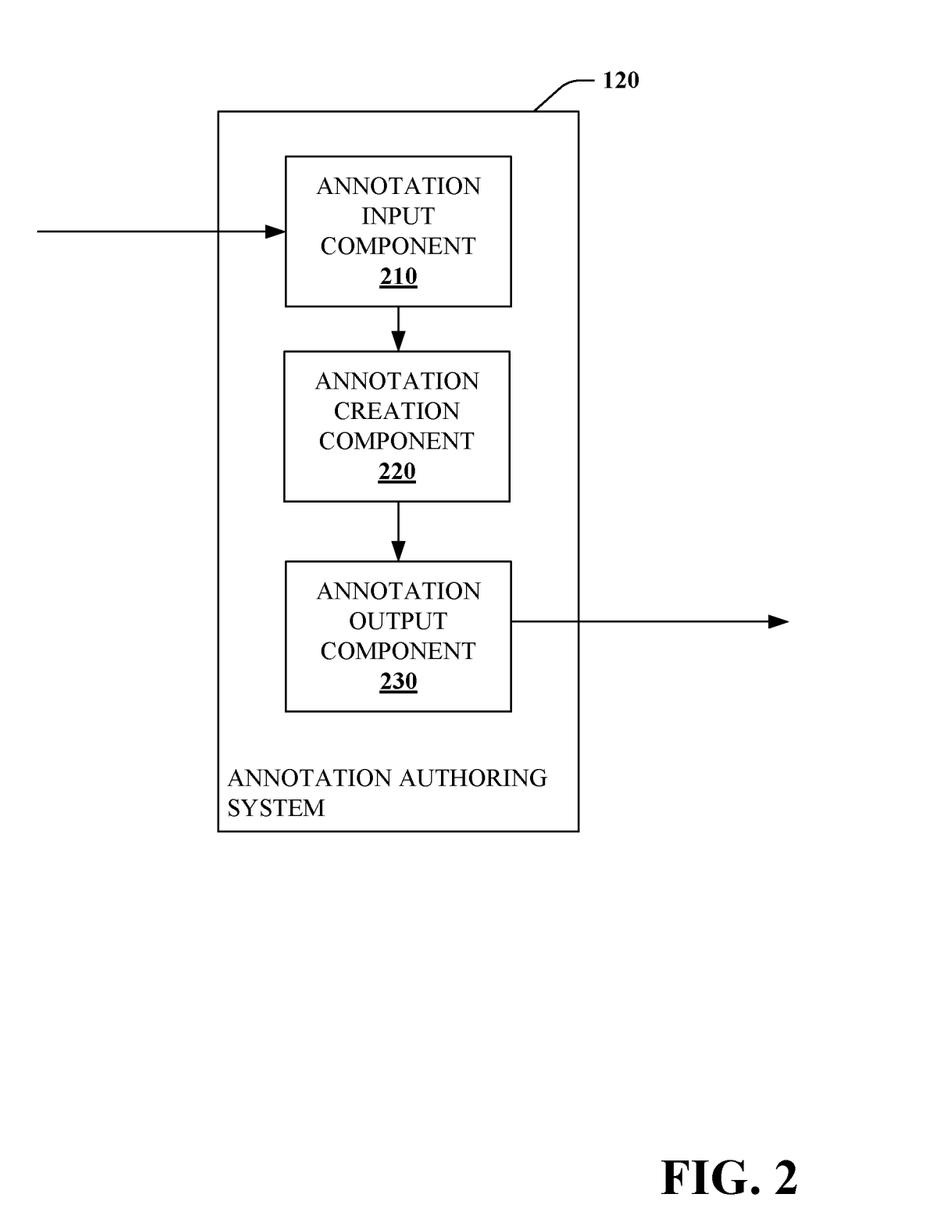
FIG. 2 is a functional block diagram that illustrates an annotation authoring system.

Turning to FIG. 2, with continued reference to FIG. 1, the annotation authoring system 120 can include an annotation input component 210, an annotation creation component 220 and an annotation output component 230. A first user of the first browser 110 can utilize the annotation authoring system 120 to create annotation(s) associated with particular portion(s) of particular content (e.g., web page).

The annotation input component 210 receives user input associated with the first user of the first browser 110. In one embodiment, the annotation input component 210 receives information from the user identifying the user to the annotation/retrieval system 130, for example, a user identifier (e.g., numeric, globally unique identifier (GUID), alphanumeric, user name and the like) that uniquely identifies the first user within the annotation/retrieval system 130. In one embodiment, the annotation input component 210 can further authenticate the first user to the annotation/retrieval system 130.

The annotation creation component 220 receives user input associated with creation of an annotation. The user input can include identification (e.g., selection) of a particular portion of the particular content displayed in the first browser 110. In one embodiment, the first user can select a character, word, phrase, sentence, paragraph to annotate. Once the particular portion of the content has been selected, the first user can provide an annotation to associated with the particular portion of the content.

Figure 3:
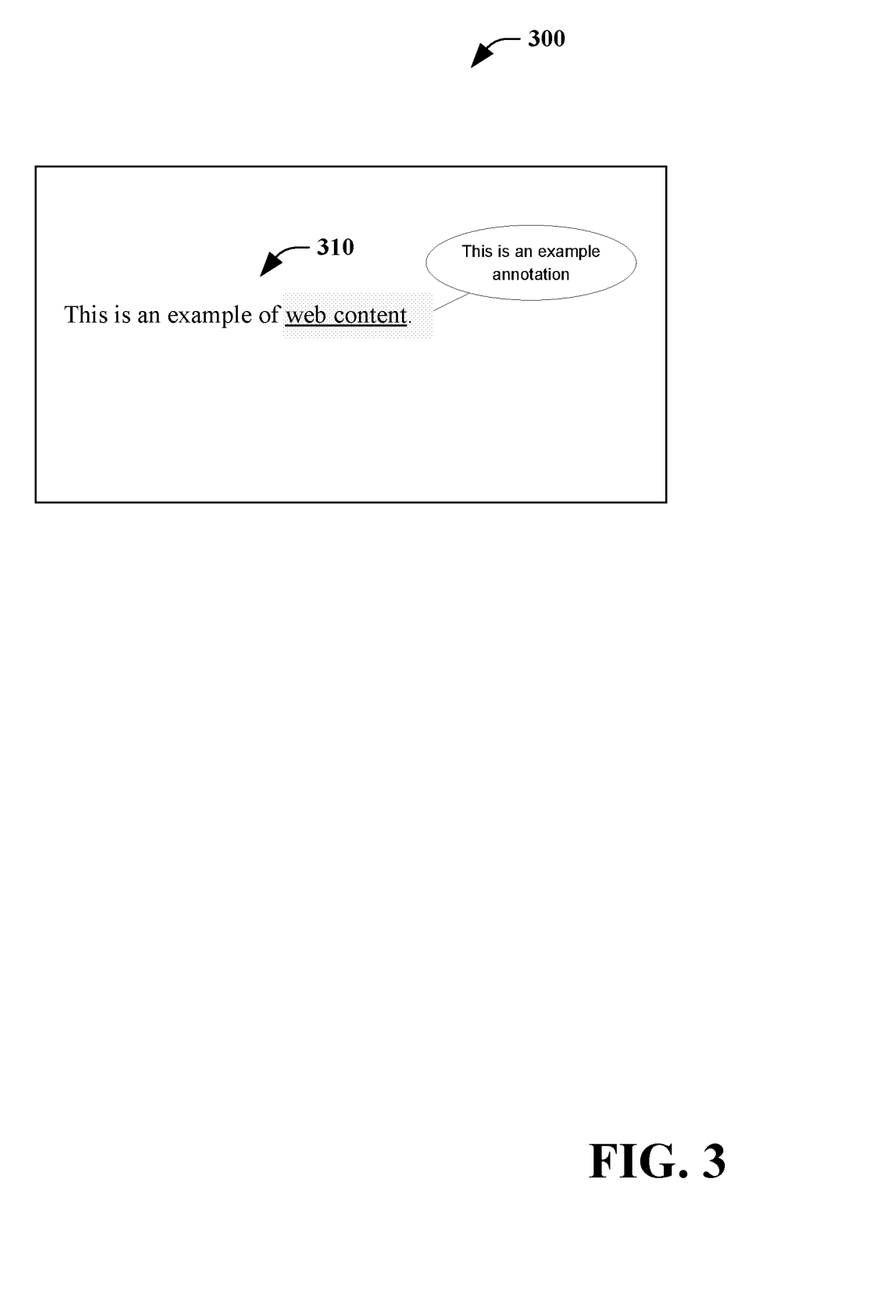
FIG. 3 illustrates an exemplary user interface of an annotation authoring system.

Turning briefly to FIG. 3, an exemplary user interface 300 of an annotation authoring system is illustrated. The user interface includes content 310 of which a user has selected "web content" to annotated with "This is an example annotation." In one embodiment, the user interface is presented by the first browser 110 and provides option(s) to facilitate anchored annotations (e.g., highlight and notes on textual contents) for web page(s). In one embodiment, the first user can select text and, in response, surface an inline content menu to add annotation(s).

In one embodiment, the particular portion of the content selected by the first user comprises text. In one embodiment, the particular portion of the content selected by the first user comprises an image and/or graphical representation.

In one embodiment, the annotation comprises text. In one embodiment, the annotation comprises an audio file (e.g., voice file), image file and/or graphical representation (e.g., emoticons). In one embodiment, the first user can employ a hierarchical ranking of a plurality of annotations such that an annotation of greater significance is identified in a particular manner (e.g., highlighted in red) while annotations of lesser significant are identified in another particular manner (e.g., highlighted in yellow). Accordingly, consumer(s) of the annotations can readily ascertain annotation(s) deemed of greater significance and those of less significance by the author of the annotations.

Referring back to FIG. 2, with continued reference to FIG. 1, the annotation output component 230 can provide information to be used to create an anchored annotation, for example, to the annotation storage/retrieval system 130. In one embodiment, the annotation output component 230 can provide the user input associated with the first user received by the annotation input component 210 (e.g., user identifier), information identifying the particular content (e.g., Uniform Resource Identifier (URI) of web page), the identified particular portion of the content selected by the first user received by the annotation creation component 220 (e.g., selected text) and the annotation to associate with the particular portion of the content received by the annotation creation component 220.

Figure 4:
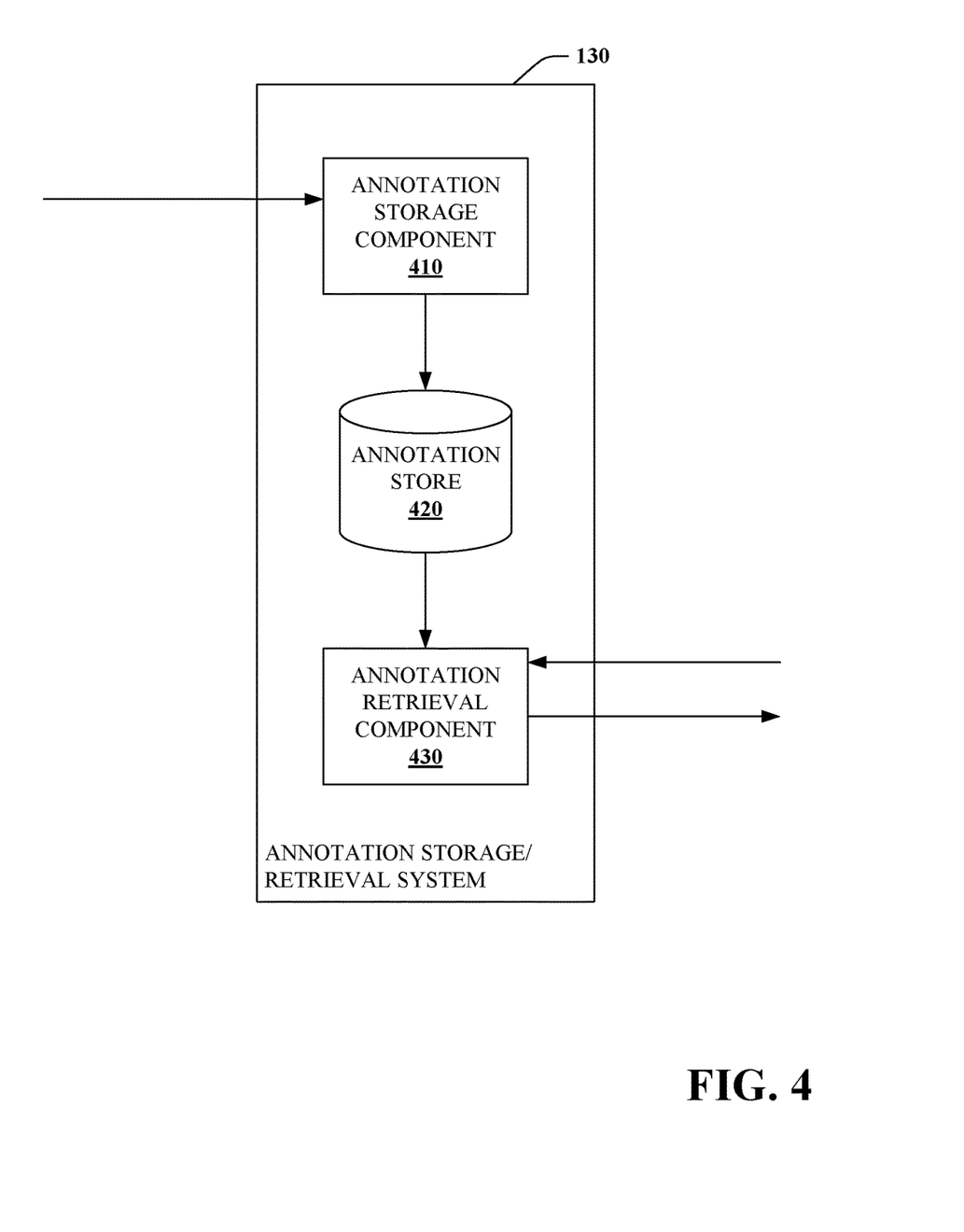
FIG. 4 is a functional block diagram that illustrates an annotation storage/retrieval system.

Turning to FIG. 4, the annotation storage/retrieval system 130 can include an annotation storage component 410, an annotation store 420 and an annotation retrieval component 430. The annotation storage/retrieval system 130 can create anchored annotations, store information associated with anchored annotations and/or selectively retrieve (e.g., filter) the anchored annotations in response to request(s) for annotations associated with particular contents (e.g., web page(s)).

The annotation storage component 410 can create an anchored annotation based upon information received, for example, from the annotation output component 230. In one embodiment, the anchored annotation is created based on the user input associated with the first user (e.g., user identifier), the particular portion of the content selected by the first user and the annotation to associate with the particular portion of the content.

In one embodiment, annotations for a specific selected text are saved to the annotation storage/retrieval system 130 (e.g., an online service) with annotation type, annotation content, annotation anchor and/or author (e.g., identified by user identifier). For example, the annotation anchor can be a computed hash of the text for which the annotation is made. The computed hash can then be used as a key for locating the annotation within content associated with the annotation.

The anchored annotation can be stored in the annotation store 420. For example, the annotation store 420 can store the anchored annotation in a database or other suitable data structure to facilitate selective retrieval (e.g., indexed by web page, author, anchored text, etc.). The annotation retrieval component 430 provides anchored annotation(s) in response to a request from the annotation consuming system 150.

In one embodiment, anchored annotations stored in the annotation store 420 can be selectively retrieved (e.g., filtered) by the annotation retrieval component 430 based on a user identifier associated with the annotation author, a user identifier associated with a user of the annotation consuming system 150, a particular content identifier (e.g., web page) associated with the annotations, group membership of a user identifier associated with the annotation author (e.g., created by a member of a group) and/or group membership of a user identifier associated with a user of an annotation consuming system 150 (e.g., request to consume annotation by a member of a group).

Figure 5:
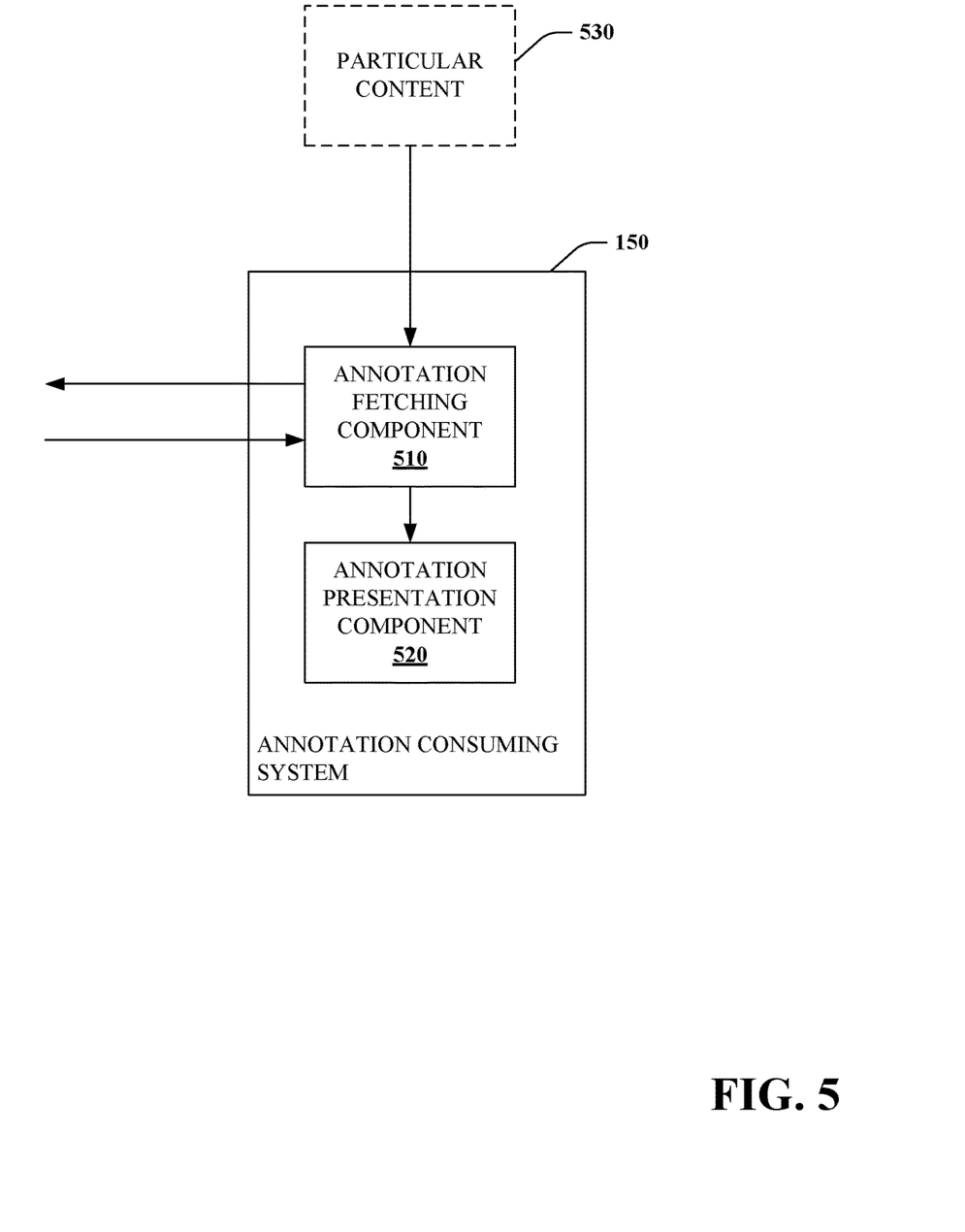
FIG. 5 is a functional block diagram that illustrates an annotation consuming system.

Next, referring to FIG. 5, the annotation consuming system 150 can include an annotation fetching component 510 and an annotation presentation component 520. As noted above, in one embodiment, the annotation consuming system 150 can be a component of a browser used for viewing content, for example, accessible via the Internet.

For example, in response to a user of the second browser 150 requesting particular content 530 (e.g., web page), the annotation fetching component 510 can request anchored annotation(s) associated with the particular content 530 from the annotation storage/retrieval system 130. In one embodiment, in addition to information identifying the particular content 530 (e.g., Uniform Resource Identifier (URI)), the annotation fetching component 510 can provide a user identifier associated with the user of the second browser 150. In one embodiment, the annotation fetching component 510 can further provide information identifying an author (e.g., user identifier) of annotation(s) of which the user of the second browser 150 is interested in receiving. In one embodiment, the annotation fetching component 510 can further provide selected content of anchored annotation(s) of which the user of the second browser 150 is interested in receiving (e.g., searchable keyword(s)).

In response, the annotation retrieval component 430 can retrieve anchored annotation(s) associated with the particular content 530. Thereafter, the annotation retrieval component 430 can provide the retrieved anchored annotation(s) to the annotation fetching component 510.

In one embodiment, the annotation retrieval component 430 further filters the retrieved annotation(s) based, for example, upon the user identifier associated with the user of the second browser 150, the user identifier associated with the author of the annotation(s) and/or provided searchable keyword(s). Thereafter, the annotation retrieval component 430 can provide the filtered, retrieved anchored annotation(s) to the annotation fetching component 510.

The annotation fetching component 510 can provide the received anchored annotation(s) to the annotation presentation component 520. The annotation presentation component 520 can format the received anchored annotation(s) for presentation (e.g., display and/or text-to-speech) to the user of the second browser 150. For example, the annotation presentation component 520 can identify a portion of the particular content 530 to which the anchored annotation(s) apply (e.g., based on stored particular portion of the web content selected by an author of the anchored annotation) and highlight or otherwise indicate the portion of the particular content 530 to which the anchored annotation applies.

In one embodiment, upon opening a particular content 530, the annotation consuming system 150 can fetch a summary of anchored annotation(s) for that particular content 530 and surface the summary inline when displaying the particular content 530. The annotation summary can contain a top annotated sections of the particular content 530 and/or a quantity of user(s) contributing to those sections. For recreating the anchored annotation(s) inline, the annotation presentation component 520 can search for the anchoring text within the particular content 530. In one embodiment, the annotation can be recreated inline if a matching text is found and a match score is above a threshold. For example, if a match score is less than the threshold, the user can be given a visual indication about content change (e.g., stored original text displayed with anchored annotation to allow the user to determine validity of the anchored annotation to a current version of the text). If a match score is below another threshold, the annotation can be anchored to the entire document rather than anchoring to a specific portion. Thereafter, a creator of the anchor can re-anchor the annotation and re-submit the annotation to the annotation storage/retrieval system 130.

In one embodiment, a visual indication can be provided by the annotation presentation component 520 to highlight top annotated sections. Details of those annotations (e.g., actual user annotations) can be fetched in response to the user explicitly requesting details of the annotations. In one embodiment, the user can add annotation(s) to a new section or contribute to an existing section. In one embodiment, the user can set visibility of the user's annotation(s) at different levels, for example, only visible to the creator of the annotation, visible to a pre-defined set of users and/or visible without restriction. In one embodiment, the user can set a visibility level for consuming annotations, for example, the user can view the user's own annotation(s), the user can view annotation(s) from a pre-defined set of user(s) and/or view annotation(s) without restriction. In one embodiment, the annotation presentation component 520 can further identify the anchored annotation(s) in a hierarchical manner.

Figure 6:
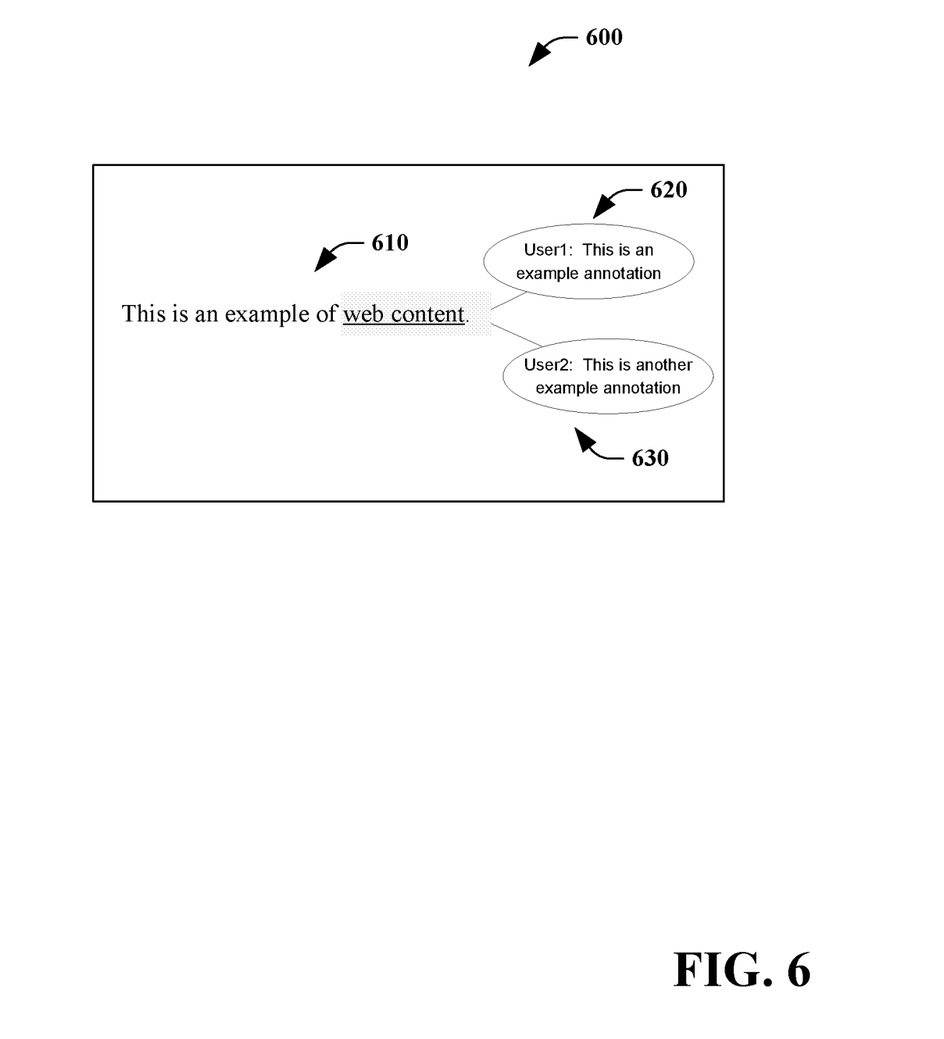
FIG. 6 illustrates an exemplary user interface of an annotation consuming system.

Turning briefly to FIG. 6, an exemplary user interface 600 is illustrated. The user interface includes content 610 of which the annotation consuming system 150 has highlighted "web content" to indicate as having anchored annotation(s). The user interface 600 further includes a first annotation 620 authored by "User1" "This is an example annotation" and a second annotation 630 authored by "User2" "This is another example annotation."

FIGS. 7-10 illustrate exemplary methodologies relating to annotating content (e.g., web page(s)). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 7:
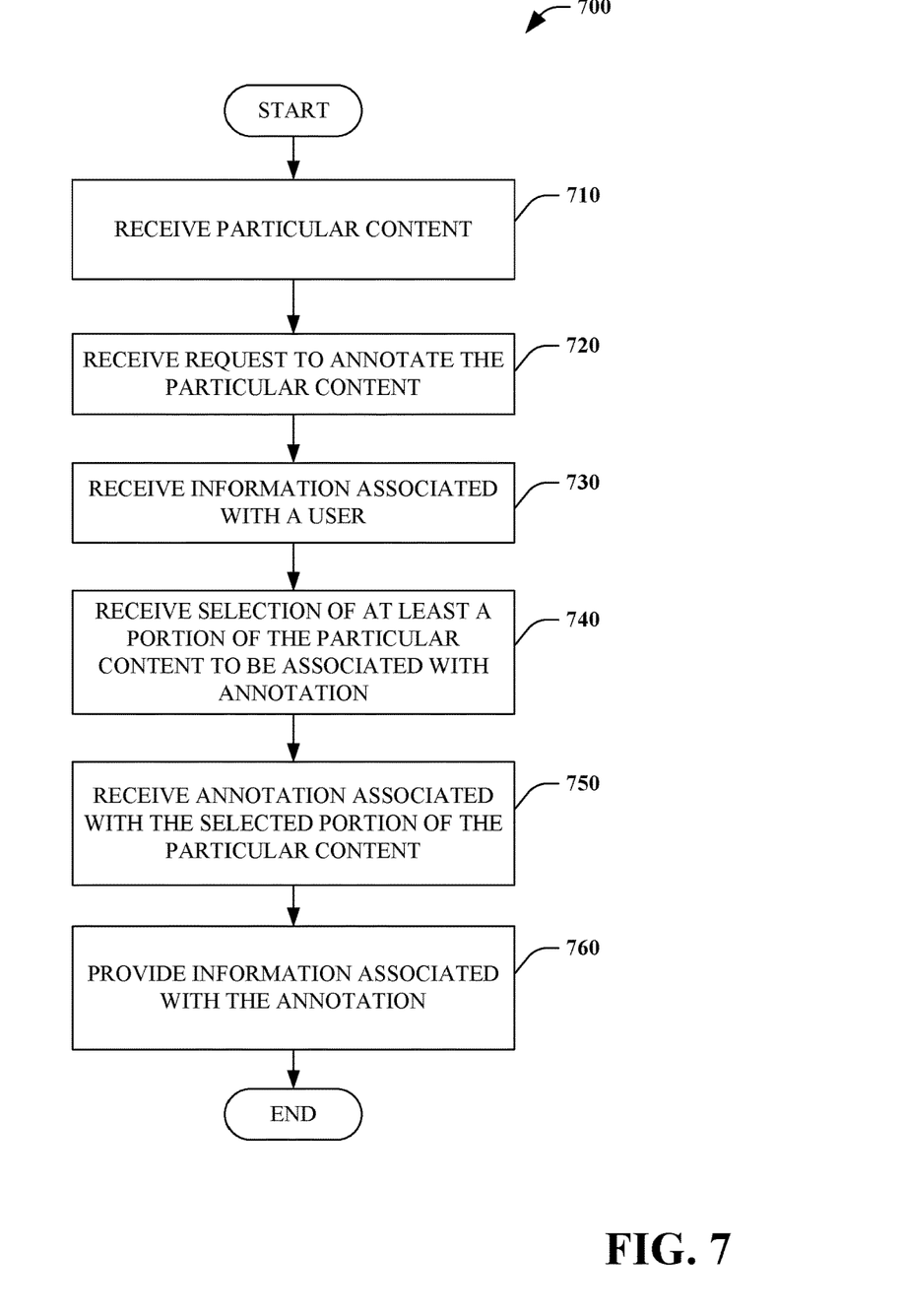
FIG. 7 illustrates an exemplary methodology of a method of annotating particular content.

Referring to FIG. 7, a method of annotating particular content 700 is illustrated. At 710, particular content (e.g., web page) is received, for example, by a first browser 110. At 720, a request to annotate the particular content is received, for example, by an annotation authoring system 120. At 730, information associated with a user is received, for example, a user identifier of a user of the first browser 110.

At 740, a selection of at least a portion of the content to be associated with an annotation is received, for example, by the annotation authoring system 120. At 750, an annotation associated with the selected portion of the content is received, for example, by the annotation authoring system 120. At 760, information associated with the annotation is provided, for example, by the annotation authoring system 120 to the annotation storage/retrieval system 130. For example, the information can include an identifier of the particular content (e.g., URI), the user identifier of the user of the first browser 110, the selected portion of the particular content (e.g., selected text to be annotated) and the annotation to associate with the selected portion of the particular content.

Figure 8:
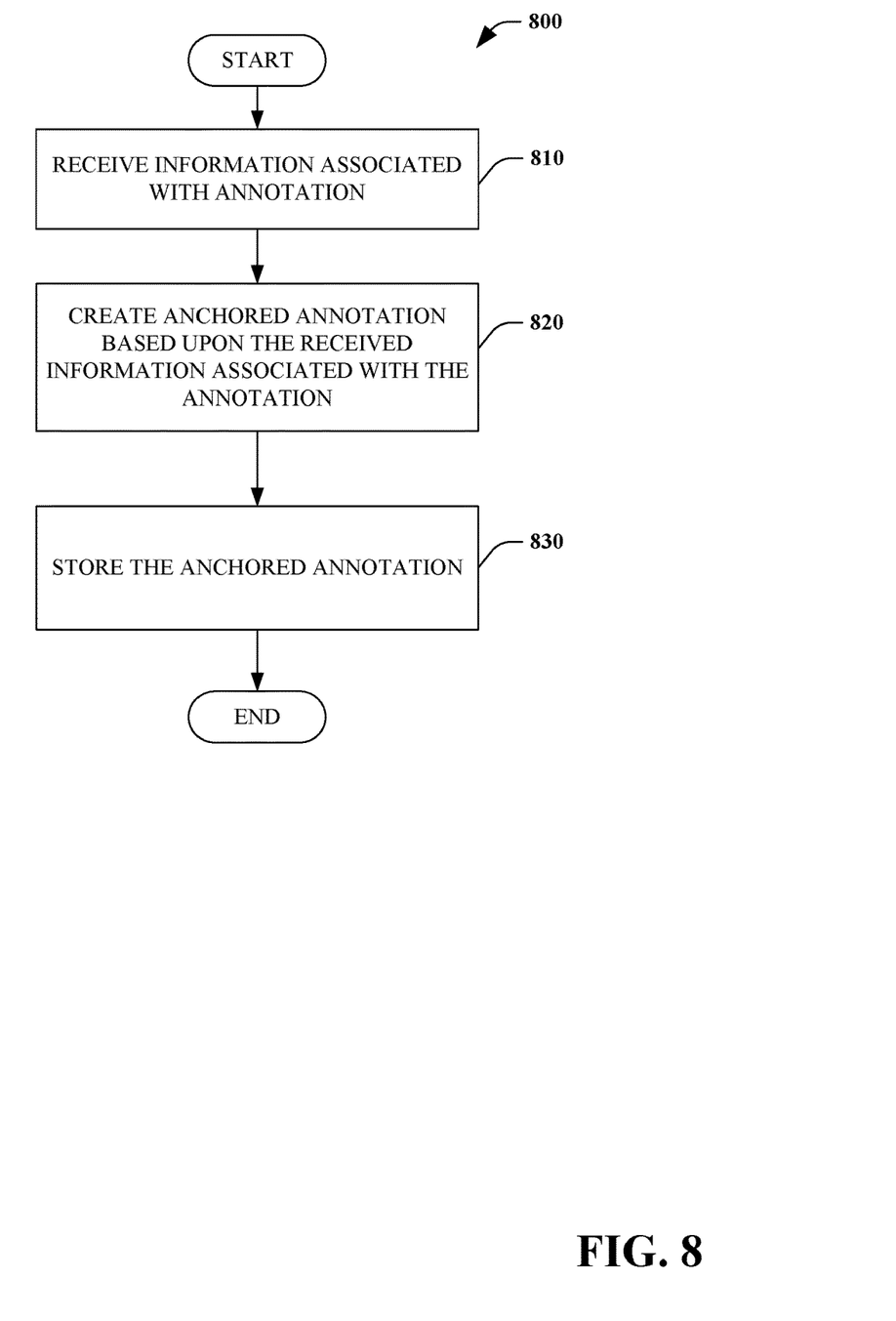
FIG. 8 illustrates an exemplary methodology of web browser enabled annotation sharing.

Next, turning to FIG. 8, a method of web browser enabled sharing 800 is illustrated. At 810, information associated with the annotation is received, for example, from the annotation authoring system 120 of the first browser 110 (e.g., web browser). For example, the information can include an identifier of particular content (e.g., URI), a user identifier of an author of the annotation, a selected portion of the particular content (e.g., selected text to be annotated) and the annotation to associate with the selected portion of the particular content.

At 820, an anchored annotation is created based upon the received information associated with the annotation. For example, the annotated anchor can be a hash of the selected portion of the particular content (e.g., text) for which the annotation is made which can serve as a key for locating the annotated anchor within the particular content (e.g., web page). In one embodiment, annotations for a specific selected text are saved to the annotation storage/retrieval system 130 (e.g., an online service) with annotation type, annotation content, annotation anchor and/or author (e.g., identified by user identifier). At 830, the anchored annotation is stored, for example, in the annotation store 420.

Figure 9:
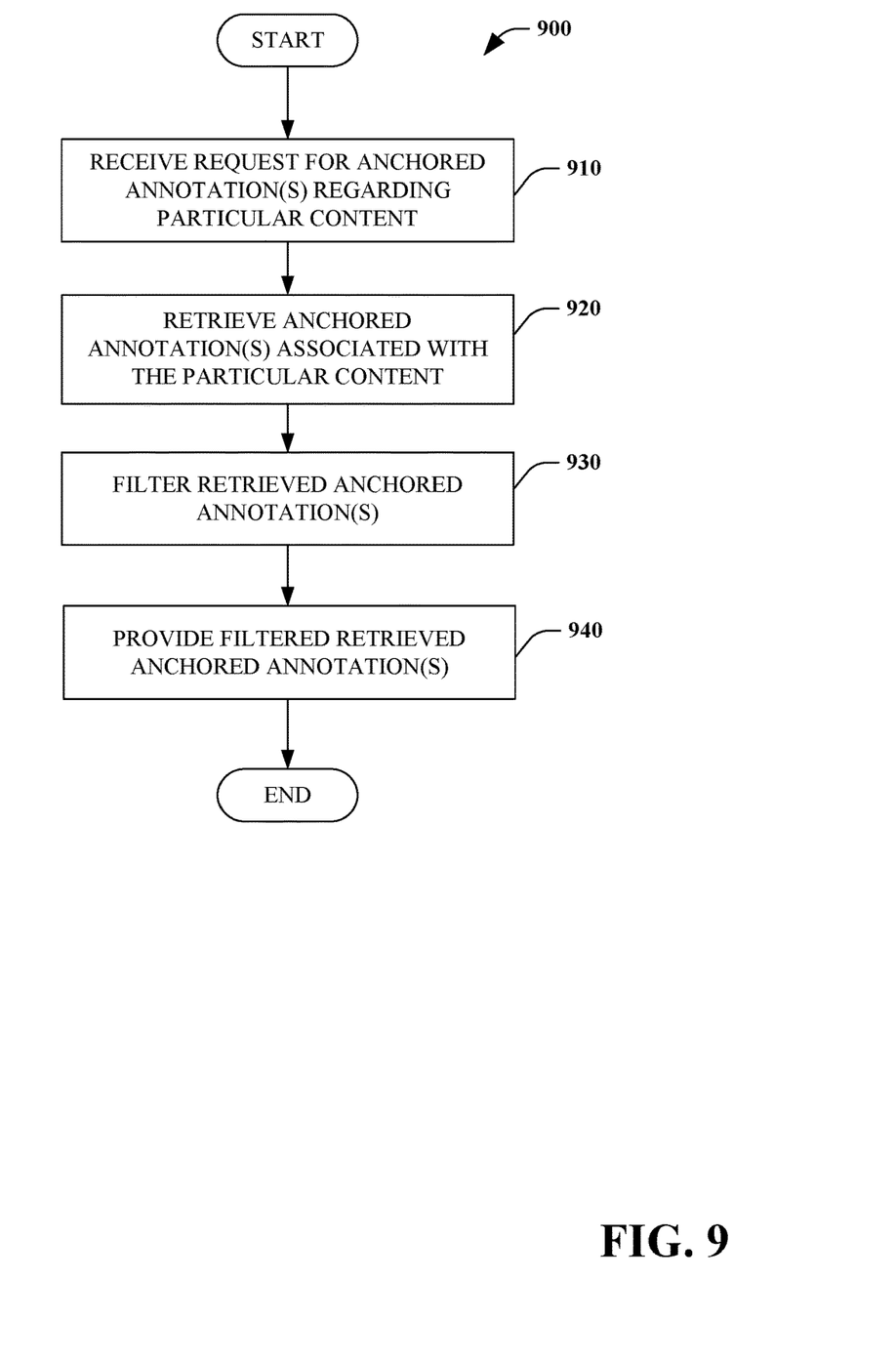
FIG. 9 illustrates an exemplary methodology of a method of retrieving an anchored annotation.

Referring next to FIG. 9, a method of retrieving an anchored annotation 900 is illustrated. At 910, a request for anchored annotation(s) regarding particular content is received, for example, from the annotation consuming system 140 of the second browser 150 (e.g., web browser). The request can include information, for example, a user identifier associated with a requesting user, an identifier of the particular content for which anchored annotation(s) are requested (e.g., URI of web page) and/or user identifier(s) associated with author(s) of anchored annotation(s). In one embodiment, the request can further include search word(s), term(s) or phrase(s) to be used to filter retrieved anchored annotation(s). For example, annotation(s) can be created to include words such as "important" or "background" to indicate relative significant to viewers of the anchored annotation(s).

At 920, anchored annotation(s) associated with the particular content are retrieved, for example, based upon the information included in the request. At 930, the retrieved anchored annotation(s) are filtered based, for example, upon a user identifier associated with a user requesting anchored annotation(s) and/or a user identifier associated with a creator of the anchored annotation(s). In one embodiment, the retrieved anchored annotation(s) are further filtered based upon received search word(s), term(s) and/or phrase(s). At 940, the filtered anchored annotation(s) are provided to the requesting entity (e.g., second browser 150).

Figure 10:
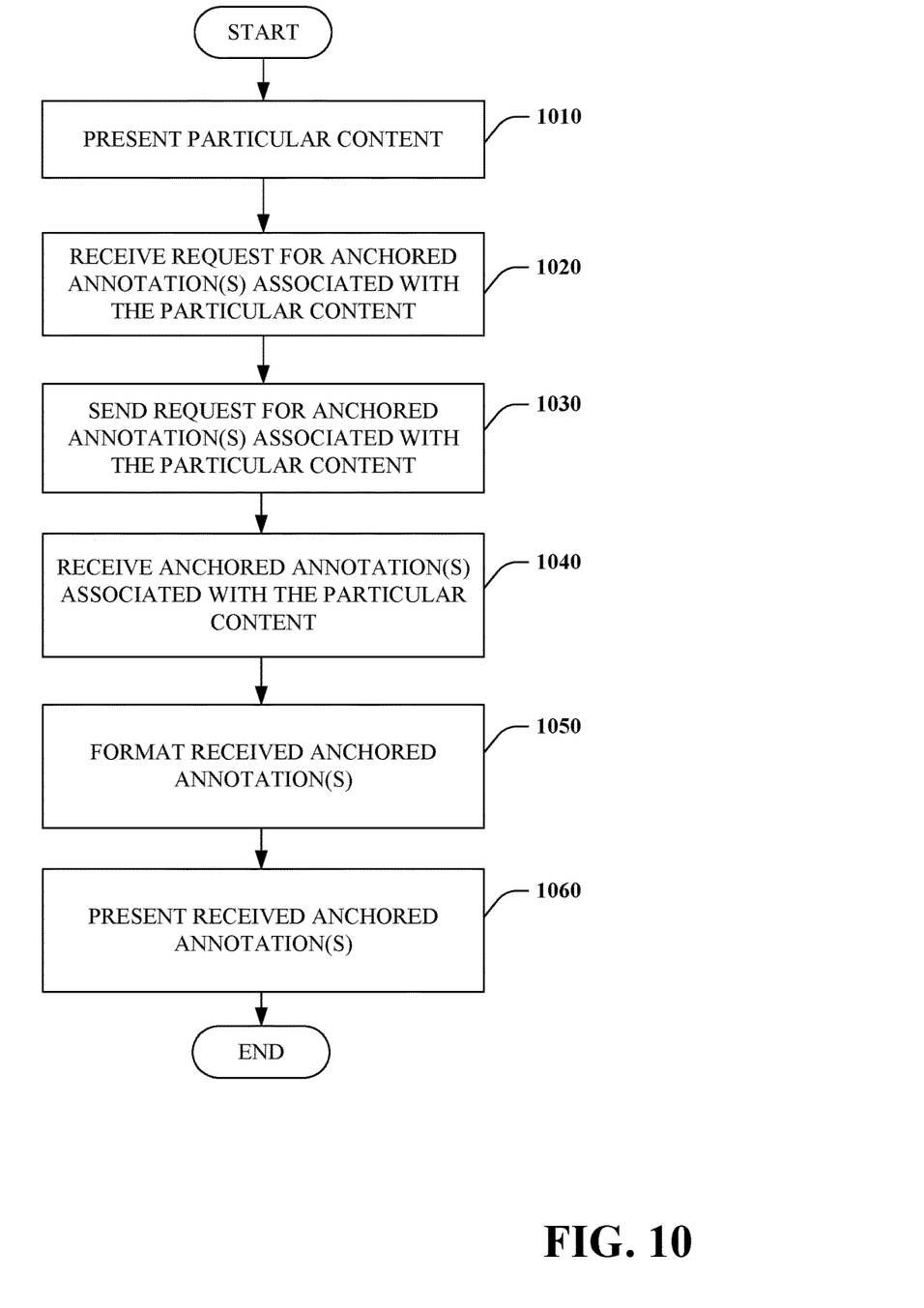
FIG. 10 illustrates an exemplary methodology of a method of presenting an anchored annotation.

Turning next to FIG. 10, a method of presenting an anchored annotation 1000 is illustrated. At 1010, particular content (e.g., web page) is presented to a user. At 1020, a request for anchored annotation(s) associated with the particular content is received. At 1030, a request for anchored annotation(s) associated with the particular content is sent, for example, to the annotation storage/retrieval system 130.

At 1040, anchored annotation(s) associated with the particular content are received. At 1050, the received anchored annotation(s) associated with the particular content are formatted. At 1060, the received anchored annotation(s) are presented, for example, to a user of the second browser 150.

Described herein is a method of web browser enabled annotation sharing comprising receiving information associated with the annotation from a web browser, creating an anchored annotation based upon the received information associated with the annotation; and storing the anchored annotation. The method can further include wherein the information associated with the annotation comprises a user identifier of an author of the annotation, information identifying content, information identifying a particular portion of the content selected to be associated with the annotation and the annotation.

The method can further include wherein creating the anchored annotation comprises computing a hash of the identified particular portion of the content selected to be associated with the annotation. The method can include wherein the annotation comprises text. The method can further include wherein the annotation comprises an audio file.

Described herein is a computer storage media storing computer-readable instructions that when executed cause a computing device to receive a request from a web browser for an anchored annotation associated with particular content, retrieve anchored annotations associated with the particular content, filter the retrieved anchored annotations; and provide the filtered retrieved anchored annotations. The computer storage media can further include wherein the request comprises information associated with a user initiating the request.

The computer storage media can include wherein the filter the retrieved anchored annotations is performed based on the information associated with the user initiating the request. The computer storage media can further include wherein the filter the retrieved anchored annotations is performed based on a user identifier associated with an annotation author. The computer storage media of can store further computer-readable instructions that when executed cause a computing device to display the anchored annotation. The computer storage media can further include wherein provide the filtered retrieved anchored annotation comprises providing text of the particular content used to anchor the anchored annotation and text of the anchored annotation Described herein is an annotation storage/retrieval system, comprising a computer comprising a processor and a memory. The memory can comprise an annotation storage component configured to receive information associated with an annotation from a web browser, create an anchored annotation based upon the received information associated with the annotation and store the anchored annotation in an annotation store. The memory can further comprise an annotation retrieval component configured to receive a request for anchored annotations regarding particular content, retrieve anchored annotations associated with the particular content from the annotation store, filter the retrieved anchored annotations, and, provide the retrieved filtered anchored annotation in response to the request for annotations.

The system can include wherein create an anchored annotation based upon the received information associated with the annotation comprises computing a hash of text for which the annotation is created and storing the computed hash as a key for locating the annotation within content associated with the annotation. The system can include wherein the information associated with the annotation comprises a user identifier of an author of the annotation, information identifying content, information identifying a particular portion of the content selected to be associated with the annotation and the annotation.

The system can include wherein the annotation comprises text. The system can further include wherein the annotation comprises an audio file. The system can include wherein filter the retrieved anchored annotations is performed based on the information associated with the user initiating the request. The system can further include wherein filter the retrieved anchored annotations is performed based on a user identifier associated with an annotation author. The system can include wherein filter the retrieved anchored annotation is performed based on a searchable keyword included in the request for anchored annotations. The system can include wherein provide the retrieved filtered anchored annotation comprises providing text of the particular content used to anchor the anchored annotation and text of the anchored annotation.

Figure 11:
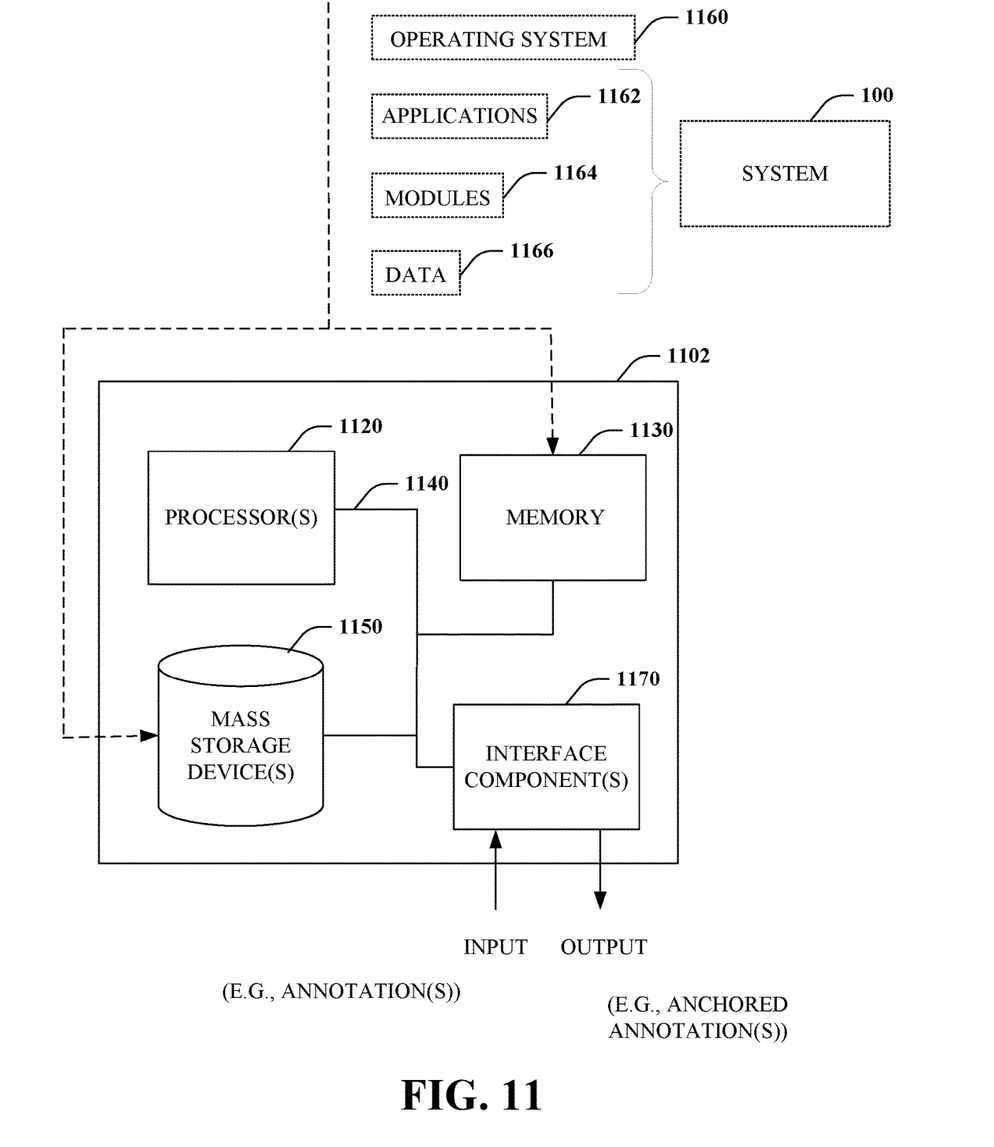
FIG. 11 is a functional block diagram that illustrates an exemplary computing system.

With reference to FIG. 11, illustrated is an example general-purpose computer or computing device 1102 (e.g., mobile phone, desktop, laptop, tablet, watch, server, handheld, programmable consumer or industrial electronics, set-top box, game system, compute node, etc.). For instance, the computing device 1102 may be used in a system for anchored annotations 100.

The computer 1102 includes one or more processor(s) 1120, memory 1130, system bus 1140, mass storage device(s) 1150, and one or more interface components 1170. The system bus 1140 communicatively couples at least the above system constituents. However, it is to be appreciated that in its simplest form the computer 1102 can include one or more processors 1120 coupled to memory 1130 that execute various computer executable actions, instructions, and or components stored in memory 1130. The instructions may be, for instance, instructions for implementing functionality described as being carried out by one or more components discussed above or instructions for implementing one or more of the methods described above.

The processor(s) 1120 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1120 can be a graphics processor.

The computer 1102 can include or otherwise interact with a variety of computer-readable media to facilitate control of the computer 1102 to implement one or more aspects of the claimed subject matter. The computer-readable media can be any available media that can be accessed by the computer 1102 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1102. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1130 and mass storage device(s) 1150 are examples of computer-readable storage media. Depending on the exact configuration and type of computing device, memory 1130 may be volatile (e.g., RAM), non-volatile (e.g., ROM, flash memory, etc.) or some combination of the two. By way of example, the basic input/output system (BIOS), including basic routines to transfer information between elements within the computer 1102, such as during start-up, can be stored in nonvolatile memory, while volatile memory can act as external cache memory to facilitate processing by the processor(s) 1120, among other things.

Mass storage device(s) 1150 includes removable/non-removable, volatile/non-volatile computer storage media for storage of large amounts of data relative to the memory 1130. For example, mass storage device(s) 1150 includes, but is not limited to, one or more devices such as a magnetic or optical disk drive, floppy disk drive, flash memory, solid-state drive, or memory stick.

Memory 1130 and mass storage device(s) 1150 can include, or have stored therein, operating system 1160, one or more applications 1162, one or more program modules 1164, and data 1166. The operating system 1160 acts to control and allocate resources of the computer 1102. Applications 1162 include one or both of system and application software and can exploit management of resources by the operating system 1160 through program modules 1164 and data 1166 stored in memory 1130 and/or mass storage device (s) 1150 to perform one or more actions. Accordingly, applications 1162 can turn a general-purpose computer 1102 into a specialized machine in accordance with the logic provided thereby. In one example, application 1162 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1162, and include one or more modules 1164 and data 1166 stored in memory and/or mass storage device(s) 1150 whose functionality can be realized when executed by one or more processor(s) 1120.

In accordance with one particular embodiment, the processor(s) 1120 can correspond to a system on a chip (SOC) or like architecture including, or in other words integrating, both hardware and software on a single integrated circuit substrate. Here, the processor(s) 1120 can include one or more processors as well as memory at least similar to processor(s) 1120 and memory 1130, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1102 also includes one or more interface components 1170 that are communicatively coupled to the system bus 1140 and facilitate interaction with the computer 1102. By way of example, the interface component 1170 can be a port (e.g., serial, parallel, PCMCIA, USB, FireWire, etc.) or an interface card (e.g., sound, video, etc.) or the like. In one example implementation, the interface component 1170 can be embodied as a user input/output interface to enable a user to enter commands and information into the computer 1102, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1170 can be embodied as an output peripheral interface to supply output to displays (e.g., LCD, LED, plasma, etc.), speakers, printers, and/or other computers, among other things. Still further yet, the interface component 1170 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computer storage media storing computer-readable instructions that when executed cause a computing device to:
   receive a request from a web browser for an anchored annotation associated with particular content;
   retrieve anchored annotations associated with the particular content;
   provide the retrieved anchored annotations; and
   provide a visual indication about content change of anchoring text within the particular content when a match score is less than a threshold, wherein the visual indication comprises stored original text displayed with the anchored annotation.

2. The computer storage media of claim 1, wherein the request comprises information associated with a user initiating the request.

3. The computer storage media of claim 2, storing further computer-readable instructions that when executed cause the computing device to: filter the retrieved anchored annotations based on the information associated with the user initiating the request.

4. The computer storage media of claim 1, storing further computer-readable instructions that when executed cause the computing device to: filter the retrieved anchored annotations based on a user identifier associated with an annotation author.

5. The computer storage media of claim 1 storing further computer-readable instructions that when executed cause a computing device to:
   display the anchored annotation.

6. The computer storage media of claim 1, storing further computer-readable instructions that when executed cause the computing device to: provide text of the particular content used to anchor the anchored annotation and text of the anchored annotation.

7. A method of retrieving an anchored annotation, comprising:
   receiving a request from a web browser for an anchored annotation associated with particular content;
   retrieving anchored annotations associated with the particular content;
   providing the retrieved anchored annotations; and
   providing a visual indication about content change of anchoring text within the particular content when a match score is less than a threshold, wherein the visual indication comprises stored original text displayed with the anchored annotation.

8. The method of claim 7, wherein the request comprises information associated with a user initiating the request.

9. The method of claim 8, further comprising filtering the retrieved anchored annotations based on the information associated with the user initiating the request.

10. The method of claim 7, further comprising filtering the retrieved anchored annotations based on a user identifier associated with an annotation author.

11. The method of claim 7, further comprising displaying the anchored annotation.

12. The method of claim 7, further comprising providing text of the particular content used to anchor the anchored annotation and text of the anchored annotation.

13. The method of claim 7, wherein the anchored annotation comprises an audio file.

14. A system, comprising:
a computer comprising a processor and a memory having computer-executable instructions stored thereupon which, when executed by the processor, cause the computing device to:
receive a request from a web browser for an anchored annotation associated with particular content;
retrieve anchored annotations associated with the particular content;
provide the retrieved anchored annotations; and
provide a visual indication about content change of anchoring text within the particular content when a match score is less than a threshold, wherein the visual indication comprises stored original text displayed with the anchored annotation.

15. The system of claim 14, wherein the request comprises information associated with a user initiating the request.

16. The system of claim 15, the memory having further computer-executable instructions stored thereupon which, when executed by the processor, cause the computing device to: filter the retrieved anchored annotations based on the information associated with the user initiating the request.

17. The system of claim 14, the memory having further computer-executable instructions stored thereupon which, when executed by the processor, cause the computing device to: filter the retrieved anchored annotations based on a user identifier associated with an annotation author.

18. The system of claim 14, the memory having further computer-executable instructions stored thereupon which, when executed by the processor, cause the computing device to: display the anchored annotation.

19. The system of claim 14, the memory having further computer-executable instructions stored thereupon which, when executed by the processor, cause the computing device to: provide text of the particular content used to anchor the anchored annotation and text of the anchored annotation.

20. The system of claim 14, wherein the anchored annotation comprises an image file.

* * * * *